(12) United States Patent
Dietz et al.

(10) Patent No.: US 11,845,253 B2
(45) Date of Patent: Dec. 19, 2023

(54) SYSTEMS AND METHODS OF APPAREL MANUFACTURING USING ADHESIVE BONDING

(71) Applicant: CreateMe Technologies LLC, New York, NY (US)

(72) Inventors: Angélique Dietz, Dronten (NL); Bettina Mueller, Vancouver (CA); Marietta Anne Greene, Portland, OR (US); Rolend Gumanas, Oakland, CA (US); Sean Magnus Becker, San Francisco, CA (US); William Kiri Thammasouk, San Jose, CA (US); Gaston Justice MacMillan, El Cerrito, CA (US); Loan Chu, Belmont, CA (US)

(73) Assignee: CreateMe Technologies Inc., Newark, CA (US)

( * ) Notice: Subject to any disclaimer, the term of this patent is extended or adjusted under 35 U.S.C. 154(b) by 0 days.

(21) Appl. No.: 18/131,101

(22) Filed: Apr. 5, 2023

(65) Prior Publication Data
US 2023/0373204 A1  Nov. 23, 2023

Related U.S. Application Data

(60) Provisional application No. 63/344,535, filed on May 20, 2022.

(51) Int. Cl.
*B32B 37/12*     (2006.01)
*B32B 5/26*      (2006.01)
(Continued)

(52) U.S. Cl.
CPC ......... *B32B 37/1292* (2013.01); *A41H 27/00* (2013.01); *B32B 3/30* (2013.01);
(Continued)

(58) Field of Classification Search
CPC .......... B32B 2437/00; B32B 2307/408; B32B 2307/406; B32B 2305/18; B32B 2255/26;
(Continued)

(56) References Cited

U.S. PATENT DOCUMENTS

| 4,670,073 A * | 6/1987 | Langley ................ B29C 66/135 156/73.2 |
| 2007/0181241 A1* | 8/2007 | Kramer ............... B29C 65/5085 156/73.4 |

\* cited by examiner

*Primary Examiner* — Vishal I Patel
(74) *Attorney, Agent, or Firm* — Moore Intellectual Property Law, PLLC

(57) ABSTRACT

Embodiments include methods of making a fabric laminates including depositing a first and a second columns of discrete adhesive masses on a first layer of fabric, wherein the first and second columns of discrete adhesive masses are separated by a first gap area, and placing a second layer of fabric on the first layer of fabric sandwiching the first and second columns of discrete adhesive masses, and applying pressure to all layers to form a fabric laminate structure while maintaining the first gap area unobstructed and forming a tunnel area between the first gap area and the first and second fabric layers. In some embodiments, ribbons may be pulled through the tunnels. In some embodiments, the tunnels include batting material. In some embodiments, films are placed on the first or second fabric layer and they imprint their surface finish onto the discrete adhesive masses wetting the surface of the fabric layers.

16 Claims, 11 Drawing Sheets

(51) Int. Cl.
  *B32B 7/14*      (2006.01)
  *B32B 38/00*     (2006.01)
  *B32B 27/12*     (2006.01)
  *B32B 27/36*     (2006.01)
  *B32B 27/32*     (2006.01)
  *B32B 3/30*      (2006.01)
  *B32B 38/06*     (2006.01)
  *A41H 27/00*     (2006.01)
  *B32B 5/02*      (2006.01)

(52) U.S. Cl.
  CPC .................. *B32B 5/02* (2013.01); *B32B 5/26* (2013.01); *B32B 7/14* (2013.01); *B32B 27/12* (2013.01); *B32B 27/322* (2013.01); *B32B 27/36* (2013.01); *B32B 38/0004* (2013.01); *B32B 38/06* (2013.01); *B32B 2255/02* (2013.01); *B32B 2255/26* (2013.01); *B32B 2305/18* (2013.01); *B32B 2307/406* (2013.01); *B32B 2307/408* (2013.01); *B32B 2437/00* (2013.01)

(58) Field of Classification Search
  CPC . B32B 2255/02; B32B 38/06; B32B 38/0004; B32B 27/36; B32B 27/322; B32B 27/12; B32B 7/14; B32B 5/26; B32B 5/02; B32B 3/30; B32B 37/1292; A41H 27/00
  See application file for complete search history.

700 ⟶

702 — Deposit 2 or more columns of adhesive on 1st layer

704 — Place 2nd layer on 1st layer

706 — Place a film on 1st or 2nd layer

708 — Apply pressure to couple 1st & 2nd layer & form tunnels

710 — Remove film & imprint indentation on 2nd layer

802 — Place a 1st fabric layer

804 — Place a 2nd layer on 1st layer & deposit a 1st & 2nd columns of adhesive masses separated by gap W 806 — Place a 3rd layer on the 2nd layer 808 — Place a film on 3rd layer and/or 1st layer 810 — Apply pressure to laminate stock 812 — Remove film

FIG. 8

SYSTEMS AND METHODS OF APPAREL MANUFACTURING USING ADHESIVE BONDING

This application claims priority from the provisional application No. 63/344,535, entitled GARMENT WITH ADHESIVE BONDS AND METHOD OF MAKING THE SAME, filed on May 20, 2022, co-owned by the same entity, and herein incorporated by reference in its entirety.

BACKGROUND

The present invention relates to systems and methods for automated fabrication of garments and similar articles. ability affects where and how a garment can be built, which also affects timeline and capability.

Despite technological advances and introduction of automation in many types of manufacturing, garment manufacturing remains very labor intensive. Sewing machines were invented in the early nineteenth century and were made possible based on the development of the lock stitch sewing technique. Today, some hundred fifty years later, this same technology remains the foundation of garments manufacturing. The modern process of producing large quantities of ready-to-wear apparels relies heavily on manual labor and relative to other industrial manufacturing it remains inefficient. Garment manufacturing includes multiple steps including sizing, folding, fitting, cutting, sewing, material handling. Traditional apparel product manufacturing processes require sewing thread and significant manual labor for each process step. Changes in the manufacturing environment and resource availability and new sustainability rules and regulations coming into effect in the next few years and decades affect where and how a garment can be built, which also affects timeline and capability.

What is needed is an apparel product manufacturing process that can adapt to where and when the product is needed.

BRIEF SUMMARY

Some embodiments include methods of making a fabric laminates including depositing a first and a second columns of discrete adhesive masses on a first layer of fabric, wherein the first and second columns of discrete adhesive masses are separated by a first gap area, and placing a second layer of fabric on the first layer of fabric sandwiching the first and second columns of discrete adhesive masses, and applying pressure to all layers to form a fabric laminate structure while maintaining the first gap area unobstructed and forming a tunnel area between the first gap area and the first and second fabric layers. In some embodiments, ribbons may be pulled through the tunnels.

Some embodiments include methods of making a fabric laminate comprising placing a first layer of fabric and depositing a first and a second column of discrete adhesive masses separated by a first gap. The method include the operation of placing a second layer of fabric on the first layer of fabric sandwiching the first and second columns of discrete adhesive masses in between and placing a first and/or second film on the first and/or second layer of fabric and applying pressure to the stack of fabric layers to form a laminate structure. As a result, the first and/or second films stamp their surface finish onto the discrete adhesive masses that have wetted the first and/or second fabric layers, leaving a mat, semi-gloss or glossy discrete adhesive mass surface that provides aesthetic benefits in addition to the functional benefits.

Some embodiments include methods of making a fabric laminate comprising the placement of a first fabric layer and the deposition a first and second column of discrete adhesive masses on the first or a second fabric layer; placing the second fabric layer on the first fabric layer; applying pressure to couple the first and second fabric layers at the first and second columns of discrete adhesive masses, wherein within a gap area between the first and the second columns of discrete adhesive masses remains open and obstructed, forming a tunnel. The method also includes the placement of precut batting or filling material in the gap areas, before or after the application of pressure to the laminate stack and the application of steam to the laminate stack to expand the volume of the batting material.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 is a flowchart of a process of forming a laminate structure in accordance with an embodiment.

FIG. 8 is a flowchart of a process of forming a multi-layer laminate structure in accordance with an embodiment.

FIG. 10A illustrates an enlargement of a site of FIG. 10 where ribbons exit certain tunnels and reenter other tunnels.

FIG. 10B illustrates an enlargement of another site of FIG. 10 where ribbons exit certain tunnels and reenter other tunnels.

DETAILED DESCRIPTION

Figure 1:
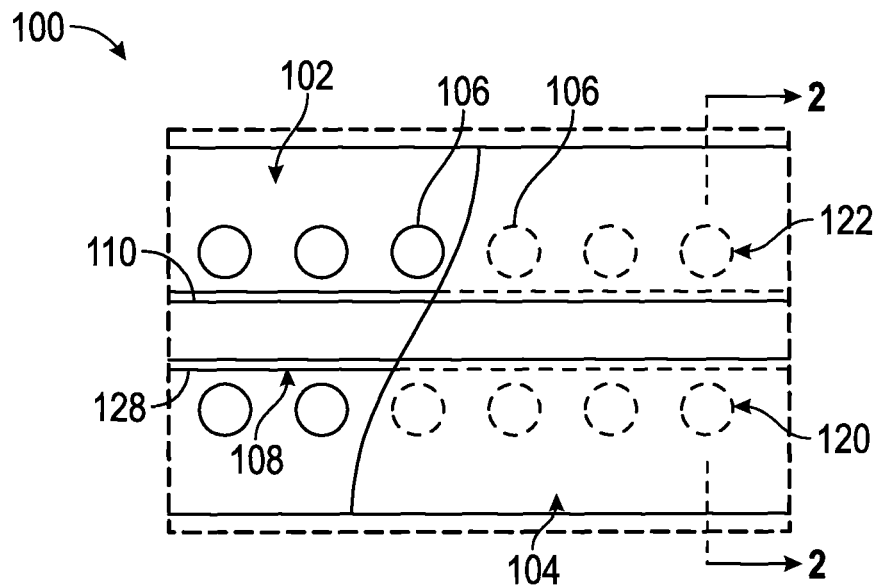
FIG. 1 illustrates a cut-away top view of a portion of laminated apparel (or apparel component) in accordance with one embodiment.

The present disclosure relates to an end to end sewing-free apparel manufacturing process. Such articles may be apparel, clothing, accessories and components used for apparel manufacturing. This process enables use of adhesive suited for natural (cellulosic and protein fibers) materials. The adhesive material is dispensed on demand. The adhesive material may be dispensed as discrete elements, such as dots, dashes, line segments and the like. The adhesive material is used in some applications to enable various manufacturing processes such as creating multi-layers fabric laminates using both natural and synthetic and blended layers. In some embodiments, various processes may take advantage of the discrete masses of adhesive deposits in both a structural function, used in coupling multiple layers of fabric in a discrete manner, while using the discrete masses of adhesive to achieve aesthetic effects enhancing or complementing the apparel or apparel component's design. Thus, the adhesive may be used both as part of the design and function to interconnect natural materials, such as wool, leather, silk, cotton and the like. The adhesive material may also be used to joint synthetic materials, and/or a combination of natural and synthetic and blended materials.

In some embodiments, the adhesive material may be dispensed on a single layer. In some embodiments, adhesive material may be dispensed on one or more layers. In some embodiments, a single formulation or type of adhesive may be used for all layers of adhesive material. In alternative embodiments, different types of adhesive material with different properties may be used for different layers or adhesive shapes within a layer. In the illustrative example, the adhesive material is a hot-melt polyurethane (HMPUR) adhesive. One of the properties of HMPUR is its ability to react with moisture present in the air to change chemically and create a strong bond between materials. This bond may then continue to strengthen over 24-96 hours until it is fully cured. As such, HMPUR is a good adhesive for use with many types of textile materials. The HMPUR may be dispensed through a hot melt dispensing spray gun that can create specific graphic patterns on demand to allow for predetermined coverage and placement of adhesive on fabric. Other adhesives with different chemistry such as those of polyester, polyamide and epoxy may also be used.

In some embodiments, the adhesive is applied using one or more patterns, each pattern designed to achieve different properties. In some embodiments, the adhesive may be applied in a non-linear pattern such as serpentine, zig zag or curvilinear manner. In some embodiments, certain adhesive patterns may provide a greater degree of movement or stretchability at the joint in a particular direction while still retaining sufficient seam strength. In some embodiments, the adhesive may be applied in discrete non-contagious dots, non-contagious stripes or ellipsoids, and positioned at one or more angles with respect to the borders of the garment. In some embodiments, the application of a pattern of non-continuous adhesive may impart the necessary bonding strength while reducing the amount of adhesive consumed as compared to a pattern requiring the continuous application of adhesive to the same area.

Some embodiments are directed to an apparel structure constructed from at least two layers of natural or synthetic fabric, each fabric layer coupled to the other layer along at least two columns of discrete masses of adhesives deposited along a path, the fabric layers forming a laminate structure. The two layers of fabric within the area between the two columns of discrete masses of adhesives are not coupled to each other, forming a tunnel that allows for ribbons to be pulled through for decorative or structural purposes.

Figure 2:
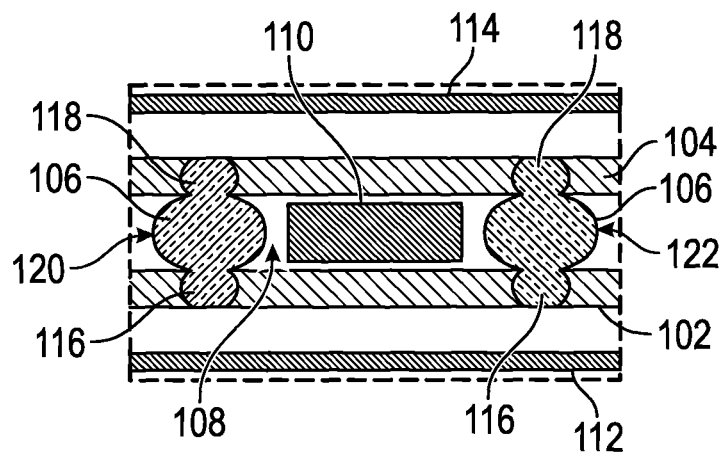
FIG. 2 illustrates a sectional view taken through section lines 2-2 of FIG. 1 in accordance with one embodiment.

FIG. 1 illustrates a cut-away top view of a portion of laminated apparel (or apparel component) in accordance with one embodiment. FIG. 2 illustrates a sectional view taken through section lines 2-2 of FIG. 1 in accordance with one embodiment. As shown in FIG. 1, the laminate structure 100 comprises a top portion or top layer 104, coupled to a bottom portion or bottom layer 102 by a plurality of discrete adhesive masses 106 deposited along two columns substantially parallel to each other. In other embodiments, the columns 120 and 122 of discrete adhesive masses 106 are not parallel to each other or deposited along a linear path. In some embodiments, the adhesive may be applied in a non-linear pattern such as serpentine, zig zag or curvilinear manner. In some embodiments, certain adhesive patterns may provide a greater degree of movement or stretchability at the joint in a particular direction while still retaining sufficient seam strength. In some embodiments, the adhesive may be applied in discrete non-contagious dots, non-contagious stripes or ellipsoids, and positioned at one or more angles with respect to the borders of the garment. In some embodiments, the application of a pattern of non-continuous adhesive may impart the necessary bonding strength while reducing the amount of adhesive consumed as compared to a pattern requiring the continuous application of adhesive to the same area.

The adhesive material is dispensed on demand. The adhesive material may be dispensed as discrete elements, such as dots, dashes, line segments and the like. The adhesive material is used in one application for function to interconnect multiple natural layers fabric and for topical aesthetic value by having a shiny effect. Use of adhesive as part of the design and functions to interconnect natural materials, such as wool, silk, cotton and the like. The adhesive material may also be used to joint synthetic materials, and/or a combination of natural and synthetic and blended materials.

The top layer 104 comprises a first piece of fabric material, while the bottom layer 102 comprises a second piece of fabric material. Each layer of fabric material may be a swath of fabric, a web of fabric, a cut apparel pattern, among others. The top or second layer 104 is cutaway in FIG. 1 to reveal the discrete adhesive masses 106 and underlying bottom or first layer 102. The discrete adhesive masses 106 may be dispensed on either or both of the top and bottom portions. The discrete adhesive masses 106 are aligned in at least two columns 120 (or rows) that define the sidewalls of a tunnel 108 therebetween. The top and bottom of the tunnel 108 are formed by the portions of the top 104 and bottom 102 layers disposed between the rows of adhesive masses. A ribbon 110 may be disposed of in tunnel 108. The ribbon 110 may freely move within the tunnel 108, or be secured to one or both of the top layer 104 or the bottom layer 102. In some embodiments, during formation of the tunnel 106, in place of the ribbon 110, a precut non-stick film (not shown) may be placed in the tunnel 108 and later removed to allow space for ribbon 110. The non-stick film may be a polyester such as polyethylene terephthalate (PET), a fluoropolymer such as polytetrafluoroethylene (PTFE), or other suitable material. In some embodiments, no ribbon 110 or film 110 may be placed in the tunnel 108 prior to the formation of the laminate structure 100. In some embodiments, one or more films 112 & 114 may be placed on the first layer 102 and/or second layer 104 operable as barrier during the application of pressure to the laminate structure 100.

In some embodiments, the laminate structure 100 is formed by coupling the first fabric layer 102 and the second fabric layer 104 by the deposition of at least two columns of discrete adhesive masses 120 & 122 and applying pressure to the laminate structure 100. In some embodiments, one or more layers of film 112 and/or 114 (see FIG. 2) may be temporarily used during the formation of the laminate structure 100. The process of manufacturing the laminate structure 100 will be described in further details in relations to FIGS. 2-5.

FIG. 2 illustrates a sectional view of the laminate structure 100 in accordance with an embodiment. As shown in FIG. 2, the laminate structure 100 comprises a first or bottom layer 102, a second or top layer 104, sandwiched between a bottom layer film 112 and/or a top layer film 114. Two or more columns 120 & 122 consisting of discrete adhesive masses 106 are deposited on the first layer 102 and/or second layer 104 and activated under pressure to couple the first 102 and second 104 layers of fabric together. In some embodiments, one or more layers of film 112 & 114 may be placed on the outer face of the first fabric layer 102 and/or second fabric layer 104, respectively. The films 112 & 114 may prevent the discrete adhesive masses 106 from diffusing through the fabric and past the outer surface of the top or bottom layers 102 & 104, and contaminating other laminate structure 100 layers and material or surrounding equipment. As shown in FIG. 2, even with the use of films 112 & 114, the application of pressure to the laminate structure 100, may cause the discrete adhesive masses 106 to seep through the first layer 102 or the second layer 104 and create the "wetted" portions 116 & 118 of the first layer 102 and/or the second layer 104. The adhesive masses between different layers of fabric may have the same, different, or mixed surface finishes.

Figure 3:
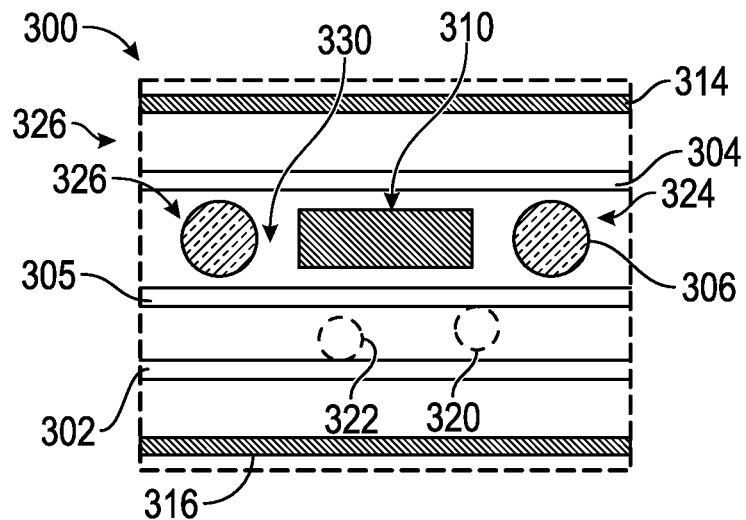
FIG. 3 illustrates a sectional view of another laminate structure 300 in accordance with an embodiment.
Figure 4:
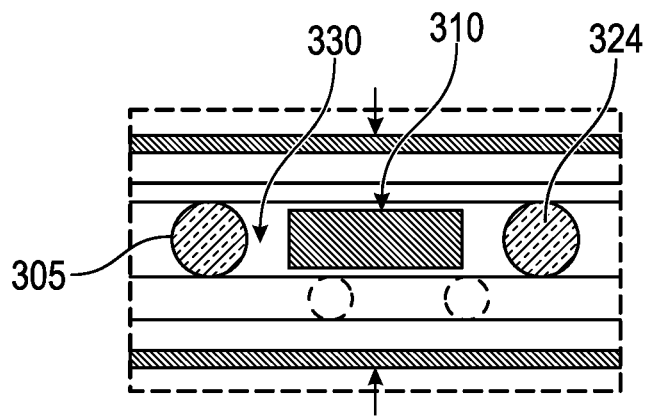
FIG. 4 illustrates a sectional view of the laminate structure 300 during the curing of the discrete adhesive masses in accordance with an embodiment.
Figure 5:
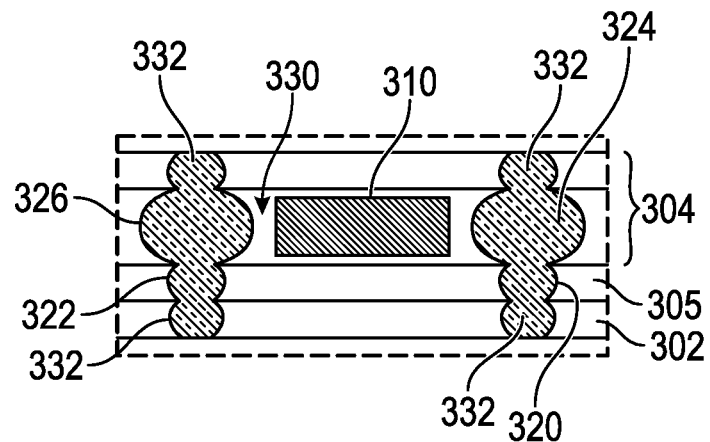
FIG. 5 illustrates a sectional view of the laminate structure 300 after the curing of the discrete adhesive masses 306 in accordance with an embodiment.

In some embodiments, when the layers of the laminated apparel article are sheer in nature, such as organza, the adhesive masses may partially or fully wet the material. As such, non-stick films 112 and 114 may be used to press the layers together will transfer the surface finish of the non-stick films 112 and 114 in contact with the wetted portion 116 and 118 of the bottom 102 and top 104 layers (i.e., the portion of the layer penetrated by the adhesive) such that the portion adhesive will have the same surface finish as the non-stick film 112 or 114 respectively. In this manner, the surface finish as the non-stick films 112 or 114 can be made glossy, semi-gloss, matte, etc., by selection of the surface finish of the non-stick films 112 or 114. This can be utilized to create a shiny, glossy and/or reflective pattern using the discrete adhesive masses 106 in the wetted regions 116 and 118. As different portions or regions of the non-stick films 112 and 114 may have different surface finishes, different portions or regions of the discrete adhesive masses 106 may also be made to have different surface finishes. Moreover, discrete adhesive masses 106 between different layers of fabric may also have the same, different, or mixed surface finishes. The ability to use adhesive masses between two layers to adhere three (or more) layers are illustrated in FIGS. 3-5. The adhesive masses are shown wetting the outer layers 116 and 118 such that the surface finish of the non-stick films 112 and 114 are transferred to the adhesive masses to produce a glossy, semi-gloss, matte, etc., surface finishes as discussed above.

In some embodiments, one or more film layers (not shown) may be cut to size and be place in between the adhesives columns 120 & 122 to preserve a desired height, width and overall size of the tunnel 108 formed in between of the adhesives columns 120 & 122 as the discrete adhesive masses 106 are put under pressure and temperature during the curing operation. Once the curing is partially or fully complete, the pre-cut film material may be removed and replaced with decorative features such as a ribbons 110.

Figure 10:
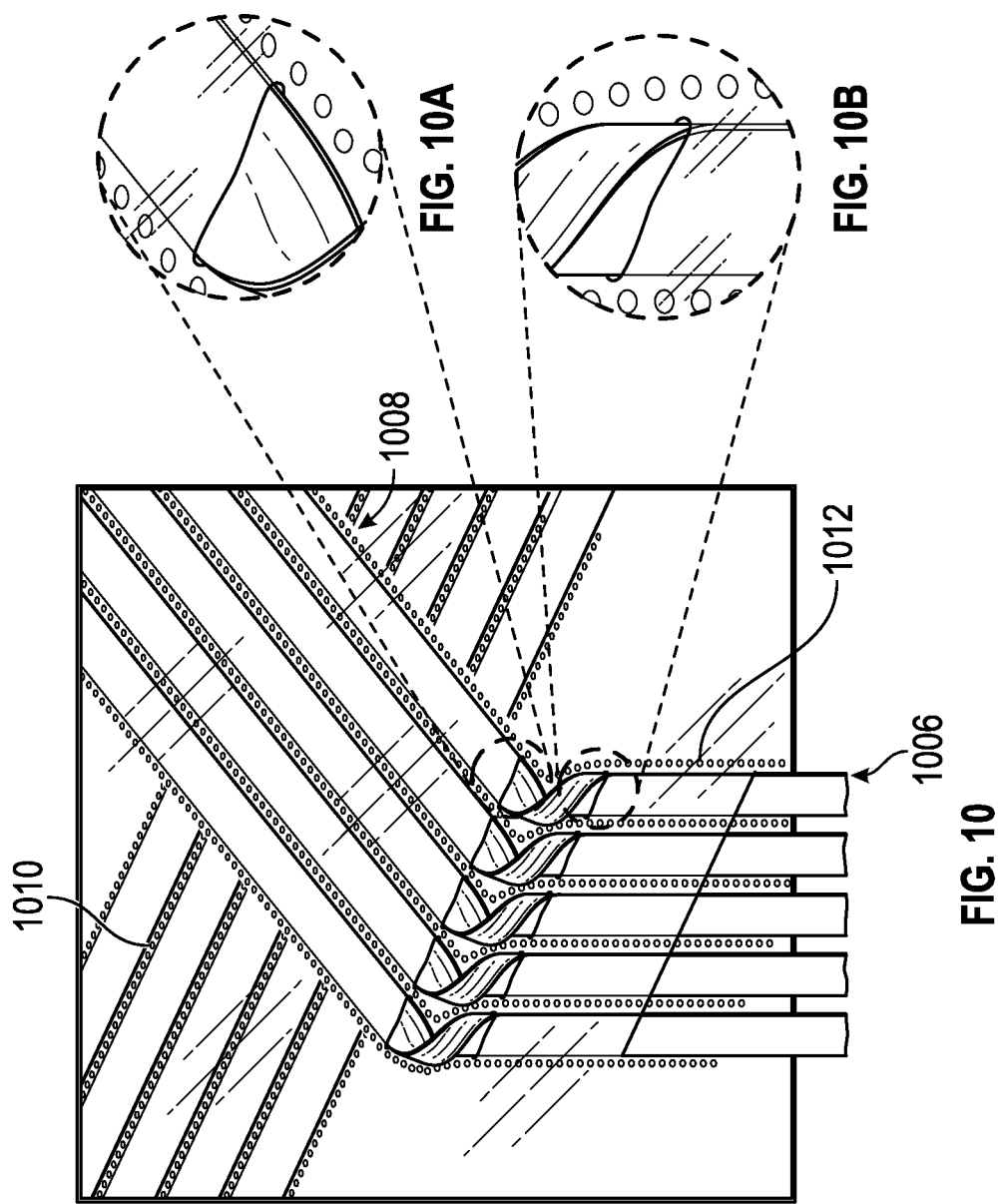
FIG. 10 illustrates an exemplary multilayered laminated fabric structure with multiple parallel tunnels formed at different layers of the lamination structure according to an embodiment.
Figure 13:
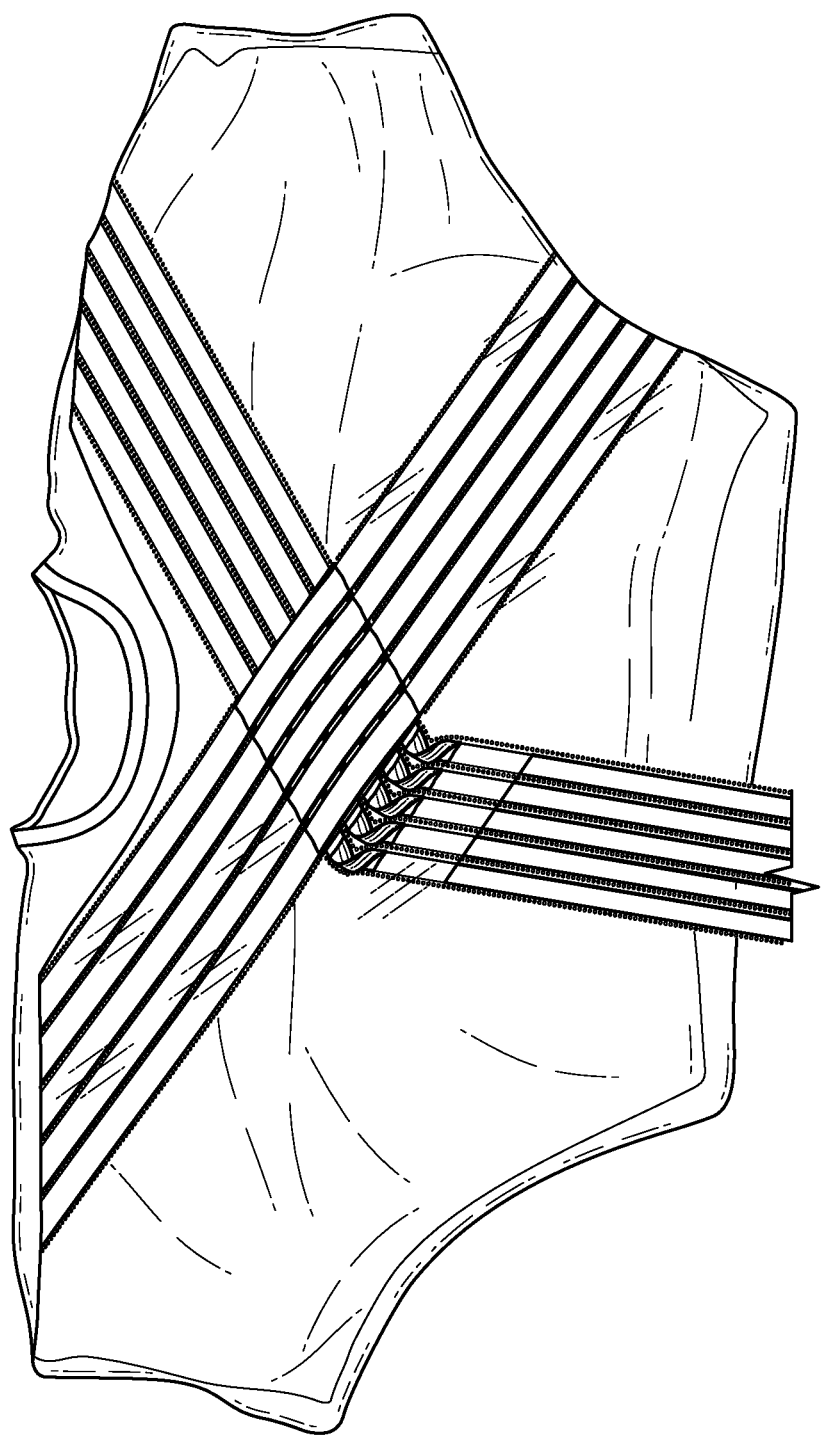
FIG. 13 illustrates an exemplary multilayered laminated fabric structure with multiple parallel tunnels formed at different layers of the lamination structure according to an embodiment.

Although the example of FIGS. 1-2 only illustrate a single tunnel 108, a plurality of tunnels 108 may also be utilized as shown in FIGS. 10 and 13. The plurality of tunnels 108 may be between two layers, some formed between a first pair of layers and other tunnels formed between a different pair of layers (the multiple layers bonded together to form a laminated fabric stack. In FIG. 10, a first group of tunnels 1008 (see FIG. 10) are formed between a top layer and middle layer, and a second group of tunnels 1010 are formed between a bottom layer and the middle layer. Tunnels of the first group may be aligned in the same direction as the second group, or be aligned in a non-parallel directions, such as directions forming an included angle between 5 and 175 degrees.

FIG. 3 illustrates a sectional view of another laminate structure 300 in accordance with an embodiment. As shown in FIG. 3, the laminate structure 300 includes 3 fabric layers, a first layer 302, a second or middle layer 305 and a top or third layer 304. In some embodiments, discrete adhesive masses 306 are deposited on the first layer 302 or second layer 305 on the side of the second layer's surface opposing the first layer, forming substantially parallel columns 320 and 322 of discrete adhesive masses 306. In alternative embodiments, the columns 320 and 322 may not be parallel to each other or linear along part or all its length. Discrete adhesive masses 306 may also be deposited on the third layer 304 and/or the second layer's 305 surface opposing the third layer 304 and forming substantially parallel columns 324 and 326 discrete adhesive masses 306. In alternative embodiments, the columns 324 and 326 may not be parallel to each other or linear along part or all its length. After the pressing of the fabric stack 300, the pair of columns (320, 322) and (324, 326) may form a tunnel. In the exemplary embodiment of FIG. 3-5, only the columns 324 and 326 form a tunnel 330 while the second layer 305 and top layer 304 may form the floor and ceiling of the tunnel 330. In this exemplary embodiment, by design, the pair of columns 320 and 322 collapse and do not form a tunnel.

Although the example of FIGS. 3-5 only illustrate a single tunnel 330, a plurality of tunnels 330 may also be formed based on the design requirements such the designs illustrated in FIGS. 10 and 13. The plurality of tunnels 330 may be between two layers, some formed between a first pair of layers and some between a different pair of layers (the layers being bonded together by adhesive masses. In FIG. 10, a first group of tunnels 1008 (see FIG. 10) are formed between a top layer and middle layer, and a second group of tunnels 1010 are formed between a bottom layer and the middle layer. Tunnels from the first group may be oriented in the same direction as tunnels from the second group, or be oriented in a non-parallel directions forming angles between 5 and 175 degrees. Thus, each pair of discrete adhesive mass columns may form a tunnel similar to tunnel 330, and each tunnel may be oriented in a given direction per the design requirements. The exemplary embodiment of FIG. 10 illustrates a set of tunnels 1008 aligned in a first orientation and a second group of tunnels 1010 aligned in an orientation that is at a 90 degrees angle with respect to the first orientation.

The laminate structure 300 may further comprise a first film 316 and a second film 316 placed on the outer fabric layers 302 & 304. In some embodiments, additional layers of film cut to a desired size may be placed in between the columns 320 & 322 or columns 324 & 326 to help the formation of the tunnel and prevent the collapse of the tunnel under pressure. In some embodiments, column widths may vary. For example, the separation gap of the pair of column 322 and 324 may be different from the separation gap of the column pair 324 & 326. Similarly, the length and height of the tunnels may vary as compared to other tunnels or along the length of the same tunnel. Therefore, the cut pieces of film may be cut to different width and length and may be stacked in multiple layers to achieve a desired tunnel size in the case of each tunnel.

FIG. 4 illustrates a sectional view of the laminate structure 300 during the curing of the discrete adhesive masses in accordance with an embodiment. The laminate structure 300 depicted in FIG. 4, may be placed under pressure alone or in combination with heat, radiation and moisture in order to form the laminate structure 300 and to partially or fully cure the discrete adhesive masses 306. In some embodiments, films cut to size may be placed in between pairs of column 320 & 322 and/or column pair 324 & 326 to help form and preserve tunnels during the application of pressure and the curing process.

FIG. 5 illustrates a sectional view of the laminate structure 300 after the curing of the discrete adhesive masses 306 in accordance with an embodiment. Once the application of pressure alone or in combination with temperature, radiation and/or moisture is completed, the discrete adhesive masses 306 are partially or fully cured. Some of the applied discrete adhesive masses 306 may seep into the adjacent fabric layers 302, 304 & 305 resulting in a "wetted" fabric areas 332. In some embodiments, film layers 314 and 316 may be placed on the outer fabric layers 302 and 304. The removal of the non-stick film layers 314 and/or 316 after the application of pressure may cause the imprinting of the film's surface structure onto fabric layers 302 & 304, resulting in a glossy, semi-glossy or mat finish of the surface of wetted surfaces 332. In some embodiments, the type of impression left on the wetted surfaces 332 is dependent on the type of film used, the surface finish of the film, the processing conditions such as the magnitude of the applied pressure, temperature or moisture, the duration of the curing process, the type and thickness of the fabric material and other process or material factors. By adjusting the various processing and material parameters, a resulting laminate structure 300 may be achieved with desired functional and aesthetic features.

Figure 11:
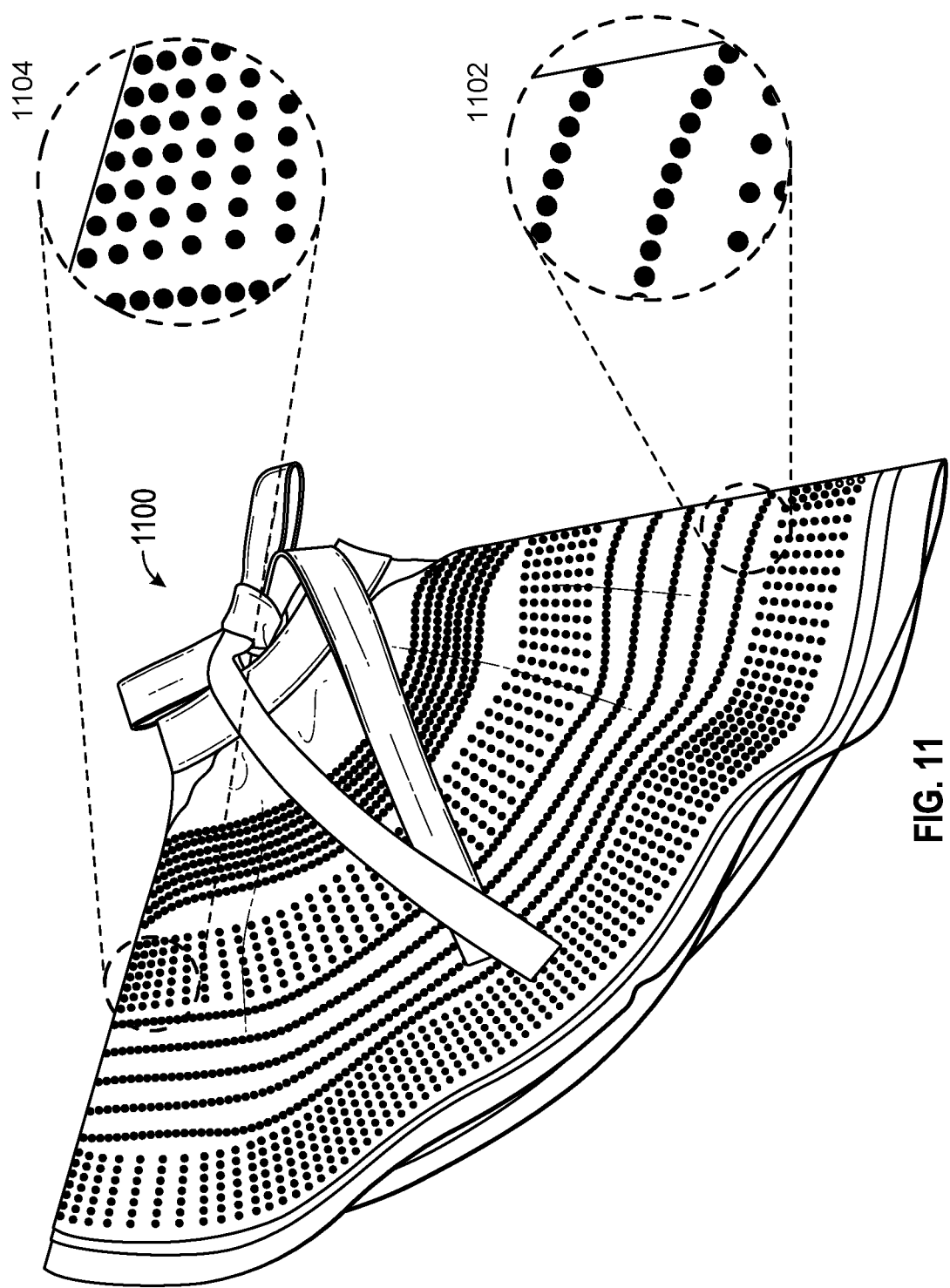
FIG. 11 illustrates an exemplary multilayered laminated fabric structure according to an embodiment.
Figure 12:
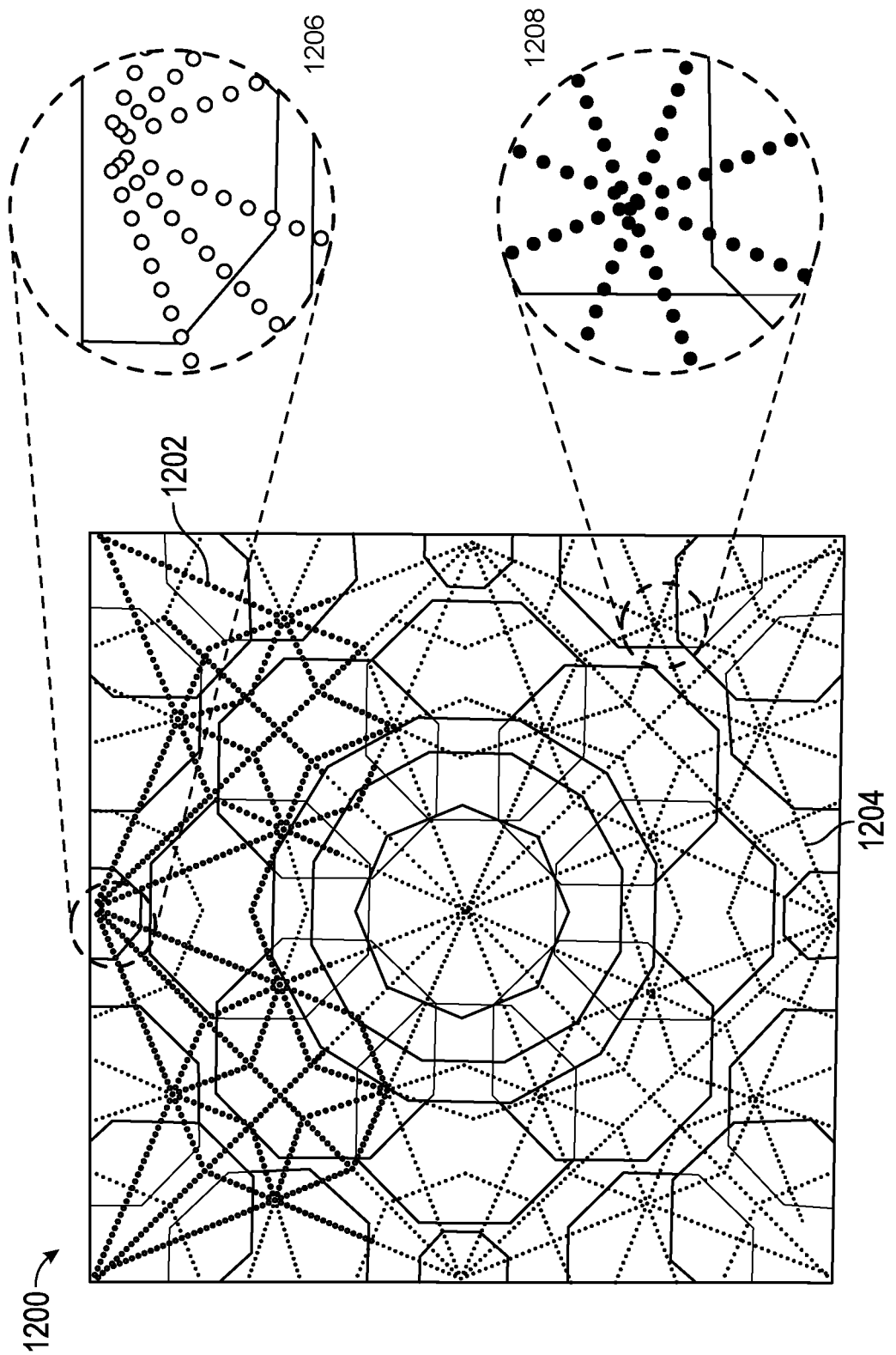
FIG. 12 illustrates another exemplary of multilayered laminated fabric structure according to an embodiment.

As shown in FIG. 5, the partially or fully cured laminate structure 300 includes a first/bottom layer 320, a second/middle layer 305 and a third/top layer 304. Furthermore, in the exemplary embodiment, a tunnel 330 of a desired height and width is formed for use in the creation of various designs. In the exemplary embodiment, a tunnel 330 is formed between the middle 305 and top fabric 304 layers. In alternative embodiments, tunnels may be formed between each pair of fabric layers or a subset of the pairs of fabric layers as the apparel design requirements dictate. Furthermore, in the exemplary embodiment of FIG. 5, the use of films 314 & 316 with a smooth surface finish may result in a glossy appearance of the first layer 302 or third layer 304 at the wetted adhesive locations 332. As illustrated in FIGS. 11 and 12, the selection of the films 314 and 316 along with a given discrete adhesive masses 306 deposition pattern may be used multi-layer apparel creations of a great variety, where the discrete adhesive masses 306 satisfy both functional requirements as well aesthetic ones.

Figure 6A:
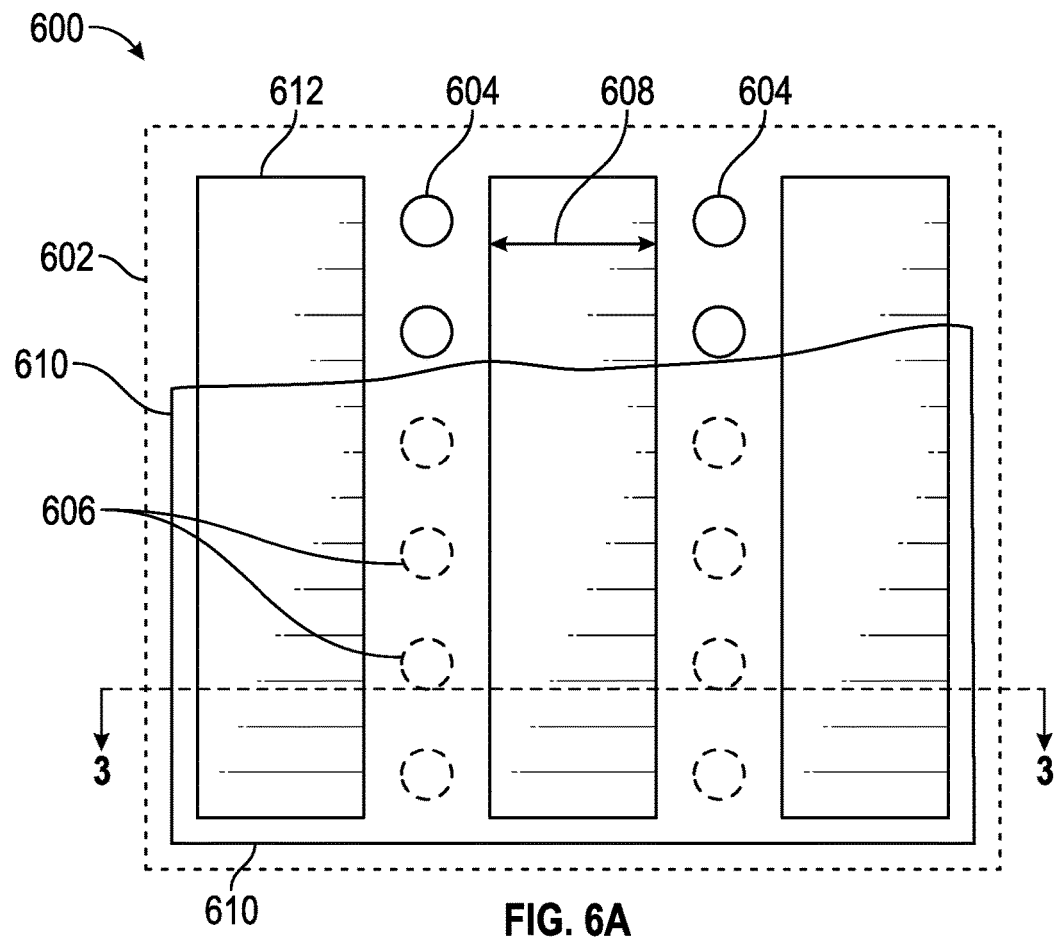
FIG. 6A illustrates a top view of the laminate structure 600 in accordance with an embodiment.

FIG. 6A illustrates a top view of the laminate structure 600 in accordance with an embodiment. As shown in FIG. 6A, a first fabric layer 602 is deposited as the first or base layer of the multi-layer fabric laminate structure 600. One or more columns 604 of discrete adhesive masses 606 may be deposited in designated locations separated by desirable gaps 606. In some embodiments, the width of the gap 608 separating pairs of deposited adhesive columns are uniform across the length of the columns or across pairs of columns. In alternative embodiments, the spacing or gap width 606 may vary across pairs of columns 604 or along the length of a pair of columns based aesthetic or functional requirements. In some embodiments, the columns 604 of discrete adhesive masses 606 extend along a straight linear path. In some embodiments, the columns 604 may follow patterns other than a linear path. In some embodiments, the columns 604 may form parallel to paths. In some embodiments the columns 604 may form paths that intersect at one or more points.

Referring back to FIG. 6A, batting filling, or padding material 612 cut to size are placed in desired locations in between the columns 604. In some embodiments, the batting materials may be adhered to the base layer by adhesives. In some embodiments, batting materials 612 are placed in desired locations without securing the batting material using adhesives. In some embodiments, discrete adhesive masses 606 may be used to secure batting materials to their designated locations to prevent their movement during the formation of the apparel stack or post manufacturing when consumers are using the finished product. After the placement of the batting materials 612, a top or second layer 610 (see FIGS. 6B & 6C) is placed on the first layer 602 and the batting filings 612. The top layer 612 is cut away in FIG. 6C to reveal the adhesive masses 606, the batting materials 612 and the base layer 602.

Figure 6B:
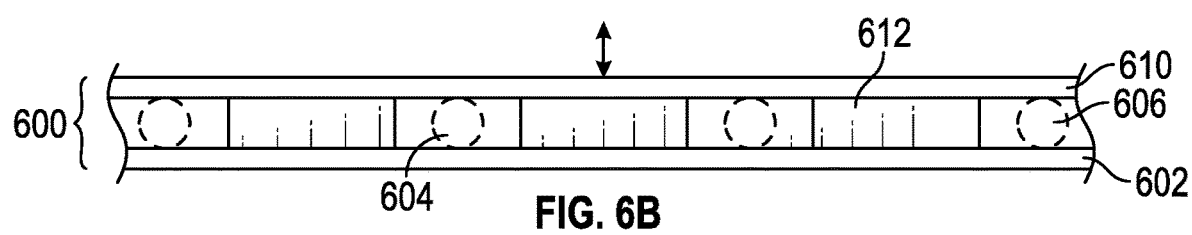
FIG. 6B illustrates a sectional view of the laminate structure 600 prior to curing in accordance with an embodiment.

FIG. 6B illustrates a sectional view of the laminate structure 600 prior to curing in accordance with an embodiment. As illustrated in FIG. 6B, the laminate structure 600 comprises of a first fabric layer 602, columns 604 of deposited discrete adhesive masses 606, one or more top layers 610 and batting materials 612 deposited in the gaps 606 between some or all adhesive columns 604. Pressure alone or in combination with temperature may be applied to the laminate structure 600 to cure the discrete adhesive masses 606 and adhere the two or more layers of fabric 602 and 610 the laminate structure 600 to each other.

Figure 6C:
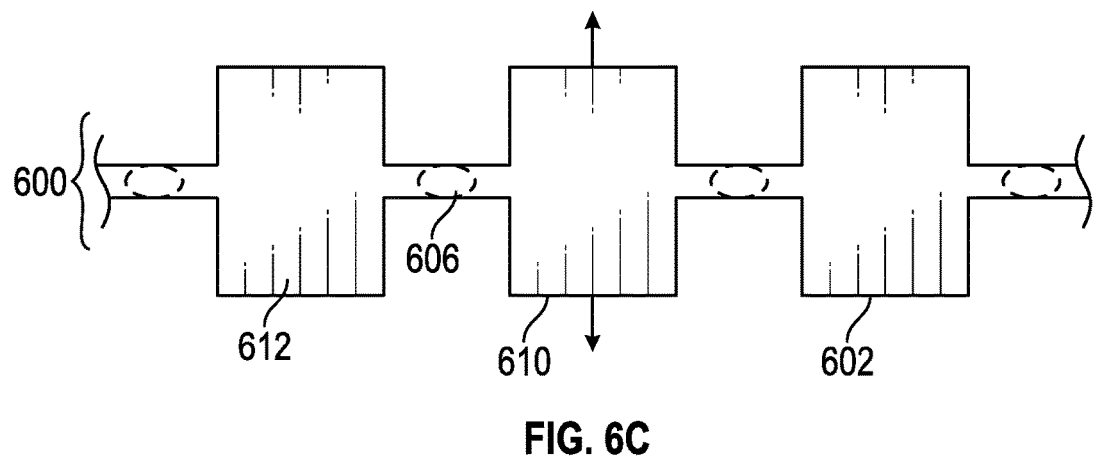
FIG. 6C illustrates a sectional view of the laminate structure 600 after the curing process in accordance with an embodiment.

FIG. 6C illustrates a sectional view of the laminate structure 600 after the curing process in accordance with an embodiment. After the curing of the discrete adhesive masses 606, steam may be applied to the laminate structure 600 to cause the expansion or puffing of the batting/padding material and achieve the desired laminate structure look. As shown in FIG. 6C, the discrete adhesive masses 606 are cured and adhere the top 610 and bottom 602 layers together, encasing the puffed up batting fillings 612. After the application of moisture or use of other methods the batting material puffs up to a greater volume to achieve the desired shape, as illustrated. In some embodiments, the batting material is inserted into the gap 606 between adhesive columns 604 only after the bottom layer 602 and the top layer 610 are adhered to each other, creating a laminate structure 600 with tunnels formed in between columns 604 of discrete adhesive masses 606.

FIG. 7 is a flowchart of a process of forming a laminate structure in accordance with an embodiment. The flowchart of FIG. 7 will be described in reference to the laminate structure 100 of FIG. 1.

In operation 700, two or more columns of discrete adhesive masses 106 are deposited on a first or base fabric layer 102 which forms the bottom layer 102 of the laminate structure 100. In alternative embodiments, discrete adhesive masses 106 may be deposited on the inner surface of the top layer 104 facing bottom layer 102. In some embodiments, the discrete adhesive masses 106 may be dispensed in a single layer. In some embodiments, adhesive material may be dispensed in one or more layers. The layers of fabric material may be one or more swatches of fabric, a web of fabric or one or more cut apparel patterns, among others. The bottom fabric layer may be formed from fabric made with natural fibers, synthetic fibers or a combination of both. In some embodiments, the discrete adhesive masses 106 may be applied to the bottom layer 102, the top layer 104, or both the top and bottom layers of fabric comprising the laminate structure 100.

In operation 704, a top layer 104 is placed on the bottom layer 102, covering the columns of adhesive 120 & 122. A tunnel 108 of a certain width is formed between the adhesive columns 120 & 122 forming the walls of the tunnel 108, the bottom layer 102 forming the floor of the tunnel 108, and the top layer 104 forming the ceiling of the tunnel 108. In some embodiments, prior to the placement of the top layer 104, non-stick film ribbon 110 cut to size and placed in the tunnel 108 (see 110 of FIG. 2).

In operation 704, a film layer 114 may be placed on the bottom layer 102 and/or top layer 104. As shown in FIG. 1, the film 114 is placed on the top layer 104. The non-stick film 114 may have a smooth or rough surface facing the top layer 104.

In operation 706, pressure alone or in combination with radiation, temperature and moisture is applied to the laminate structure 100 to fully or partially cure the dispensed discrete adhesive masses 106. A tunnel 108 of a certain width is formed between the adhesive columns 120 & 122, the bottom layer 102 and the top layer 104. In some embodiments, before placing the top layer 104 on the discrete adhesive masses 106 and the first layer 102, pre-cut non-stick film (not shown in FIG. 1) are placed in the gap areas between the two columns of dispensed adhesives 120 and 122 to prevent the tunnel 108 walls, floor or ceiling from collapsing and partially obstructing or fully closing the tunnel 108. In some embodiments, after the curing operation is completed, the pre-cut non-stick films are removed and replaced with pre-cut ribbons 110 to be used for aesthetic purposes, for example.

In alternative embodiments, pre-cut ribbons 110 are placed in between the two columns of dispensed adhesives 120 and 122 prior to placement of the top layer 104 and the adhesive curing operation. The pre-cut ribbons 110 may help keep the space within tunnel 108 unobstructed. Additionally, the pre-cut ribbons 110 may be used as decorative features. FIGS. 10 & 13 provide examples of fabric laminate structures that include columns of ribbons 110 forming part of the functional or aesthetic structure of the multilayer laminate.

In operation 708, the film layer 114 is removed. In some embodiments, the film 114 may include a smooth surface facing the top layer 104 and will impart a smooth finish to the top layer 104 at the wetted locations 118. Additionally, because of the surface finish imparted by the film layer 114 to the discrete adhesive masses 106 at the locations where the adhesive masses 106 have seeped through the top layer 104 and formed wetted surfaces or areas 116 and 118, the discrete adhesive masses 106 will appear to have a glossy finish. The amount of sheen may be dependent on the type of adhesive used and the force and duration of the pressure applied to the laminate structure 100, among other factors. In some embodiments, the film layer 114 may include a detachable layer of material such as glitter dust that may adhere to the top layer 104 when the film 114 comes into contact with top layer 104 surface. In this exemplary embodiment, the film layer 114 may impart a glitter finish to the discrete adhesive masses 106 in addition to the glossy surface.

FIG. 8 is a flowchart of a process of forming a multi-layer laminate structure in accordance with an embodiment. The flowchart of FIG. 8 will be described in reference to the formation of the laminate structure 300 of FIGS. 3-5.

In operation 802, a first fabric layer is put in place to form the first or bottom layer 302 (see FIG. 3) of the multilayer laminate structure 300, according to an exemplary embodiment.

In operation 804, a second or intermediate layer 305 is placed on the first layer 3o2. The first layer 302 and second layer 305 may be selected from the same fabric, or different fabrics based on the design requirements. Prior to the placement of the second layer 305 on the first layer 302, columns 320 and 322 of discrete adhesive masses 306 may be deposited onto one or more surfaces of the first layer 302 and/or the second layer 305. In some embodiments, the discrete adhesive masses 306 are deposited on the second layer 305 surface facing the first layer 302. In some embodiments, columns 320 and 322 of the discrete adhesive masses 306 may be deposited on both surfaces of the second layer 305. In some embodiments, the columns 320 and 322 of discrete adhesive masses 306 may be deposited on the second layer 305 on the surface not facing the first layer 302 and rely on the discrete adhesive masses 306 to seep through second layer 305 to reach the junction of the second layer 305 and first layer 302 to adhere the two layers together. Therefore, depending the properties of the second fabric layer 305 such porosity and thickness of the fabric, even in the latter case, regardless of which surface of a fabric layer the discrete adhesive masses 306 are deposited on, adhesives may travel through the thickness of the fabric layer to reach both surfaces of the layer the discrete adhesive masses 306 were deposited on.

In some embodiments, each set of columns 320 and 322 may be separated by a gap of uniform width across the entire fabric, or across one surface of a fabric. In some embodiments, the gap width and other characteristics of the deposited adhesive may vary as you move from one layer to another, from one surface to another, from one pair of adhesive columns to another or across the length of a pair of adhesive columns. In some embodiments, the spacing between adjacent beads of adhesive along a column, the shape or the volume of each deposited adhesive mass may be varied along a column of deposited adhesive. In some embodiments, the orientation of adhesive columns may vary.

In operation 806, a third fabric layer 304 may be placed on the second fabric layer 305 to complete the laminate structure 300 stack. In alternative embodiments, the multilayer laminate structure 300 may include four layers, five layers, 10 layers or more. Prior to or after the placement of the third fabric layer 304, at least two columns 320 and 322 of discrete adhesive masses 306 may be deposited on the third fabric layer 304. In some embodiments, the discrete adhesive masses 306 are deposited on the surface of third layer 304 facing the second layer 305. In some embodiments, the discrete adhesive masses 306 may be deposited on both surfaces of the third layer 304. Depending the properties of the third fabric layer 304 such porosity and thickness of the fabric, discrete adhesive masses 306 may seep through the third fabric 306 and wet one or both surfaces 332 of the third fabric layer 304 before or during the process of curing the discrete adhesive masses 306. As a result, fabrics on either side of the third layer 304 may adhere to the third fabric layer 304 to form part or all of the laminate structure 300.

In operation 808, a non-adhesive film 316 and 314 may be placed on the first layer 302 and/or third layer 304 respectively. In the exemplary embodiment shown in FIG. 3, the film 314 is placed only on the third layer 304 and film 316 is placed on the first layer 302. The non-adhesive films 314 and 316 may include one or more areas with rough or mat surfaces, semi-rough or semi-glossy surfaces, or smooth or glossy surfaces. In some embodiments, each film 314 and 316 may include a surface including areas each with different surface finish. For example, the film 314 may have a mat finish along part of its surface area and the remainder of its surface area may have a glossy finish. As such, during the curing operation of the discrete adhesive masses 306, the film 314 may impart a glossy finish to some parts of the third layer 304 and a mat finish to other parts of the third layer 304 because of the surface finish of the film 314.

In operation 810, pressure alone or in combination with temperature, radiation and/or moisture is applied to the laminate structure 300 to fully or partially cure the discrete adhesive masses 306. As a result of the application of pressure to the laminate structure 300, the surface finish of the films 316 and 314 may be imprinted on at least some of discrete adhesive masses 306 that have seeped through the fabric layers 302 and/or 304 and created wetted fabric surfaces 332 (see FIG. 5). For example, the imparted surface finish of the film 314 will cause the wetted surfaces 332 of the top layer 304 to have a matt finish or a glossy sheen, depending on the surface finish of film 314.

Additionally, because of the surface finish imparted by the film layers 316 and/or 314 to the discrete adhesive masses 306 at the wetted surface locations 332 where the adhesive masses 306 have seeped through the bottom layer 302 and top layer 304, the discrete adhesive masses 306 will appear to have a glossy or mat finish of the film 316 & 314 respectively. The amount of sheen may be dependent on the type of adhesive used and the force and duration of the pressure applied to the laminate structure 300, among other factors. In some embodiments, the film layers 316 and 314 may include detachable layers of material such as glitter dust that may adhere to the first layer 302 and/or top layer 304 when the films 316 and 314 come into contact with the surfaces of the first layer 302 or the top layer 304. In an exemplary embodiment, the film layer 314 may impart a glitter finish to the discrete adhesive masses 306 that has wetted the surface of top layer 304.

In operation 812, the film layers 316 and 314 are removed, leaving their imprinted surface finishes on the wetted areas 332 of the first layer 302 and/or the third layer 304. FIGS. 10 and 13 illustrate examples of multilayered fabric lamination laminate structures with multiple parallel tunnels formed at different layers of the lamination structure. FIGS. 10 and 13 illustrate parallel tunnels filled with ribbons 1008 and 1010, wherein each sets of parallel tunnels 1008 and 1010 extend in a different orientation, e.g.: the tunnels 1008 and 1008 crossing each other in a 90 degrees angle in the exemplary embodiment of FIG. 10. As illustrated in FIG. 10, tunnels 1008 are on a different plane that tunnels 1010. In FIG. 10, tunnels 1008 are formed in between layers that are above the layers that encase tunnels 101o. Furthermore, as illustrated in FIG. 10 and FIG. 13, ribbons 1006 and 1306 may be encased in tunnels along part of their length, exit the tunnels 1008 and re-enter tunnels 1012 (see FIG. 10) based on the requirements of the design. FIGS. 10A and 10B show blowups of sites 1002 and 1004 where ribbons 1006 exit tunnels 1008 and reenter the tunnels 1012. As shown at site 1002, there is a cut in the fabric layers forming the tunnels 1008, allowing for the ribbons 1106 to exit tunnels 1008 at location 1002 and reenter the tunnels 1008 at locations 1004.

Figure 9:
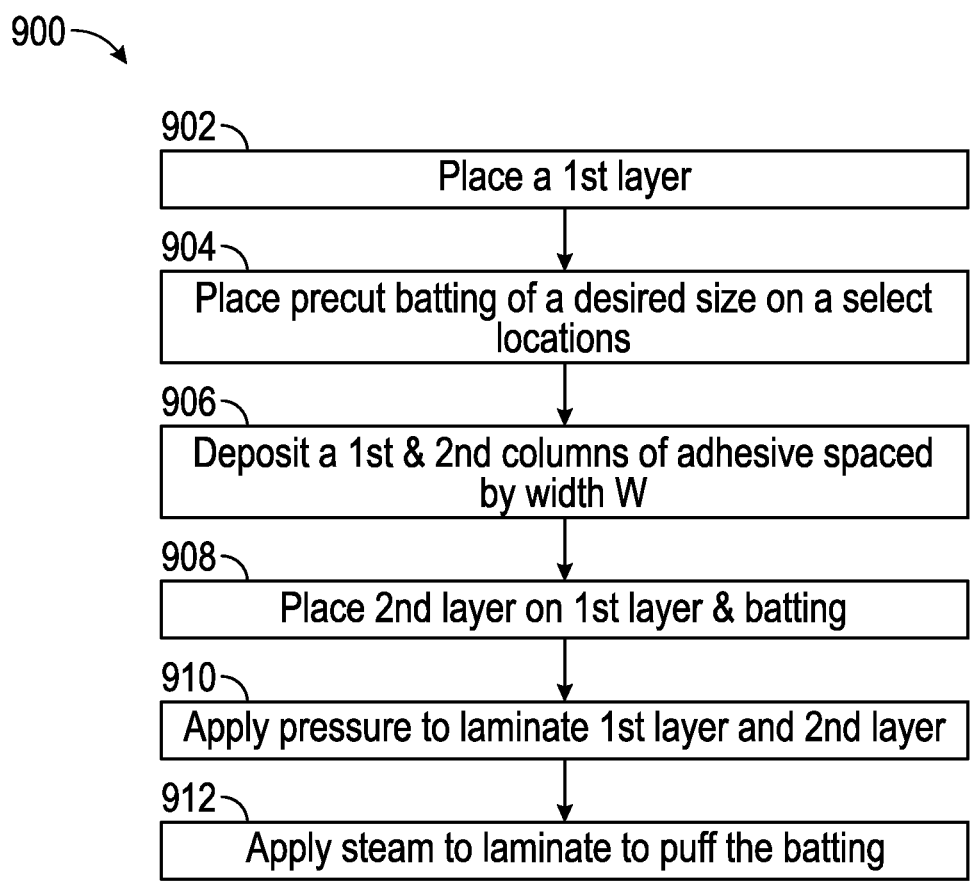
FIG. 9 is a flowchart of a process of forming a laminate structure in accordance with an embodiment.

FIG. 9 is a flowchart of a process of forming a laminate structure in accordance with an embodiment. The flowchart of FIG. 9 will be described in reference to the formation of the laminate structure 600 of FIGS. 6A-6C.

In operation 902, a first layer of fabric is put in place, forming a first layer 602 of the laminate structure 600.

In operation 604, precut batting or stuffing material 612 are placed in areas corresponding to the areas in between the locations of the adhesive columns 604. The placement of the batting materials 612 is in accordance with the requirements of the design of the laminate structure 600.

In operation 906, at least two columns 604 of discrete adhesive masses 606 are deposited along a desired pattern. The adhesive deposition pattern may be along parallel lines or lines that cross each other. In some embodiments, the deposition pattern may not be linear and may follow any desired pattern. The adhesive deposition columns form the perimeters of the batting materials 612 placement areas.

In operation 908, the second layer 610 forms the top fabric layer of the laminate structure 600. The second layer 610 covers the first layer 602, the batting materials 612 and the deposited adhesive columns 612.

In operation 910, pressure alone or in combination with temperature and/or radiation is applied to the laminate structure 600 to fully or partially cure the discrete adhesive masses 606.

Figure 14:
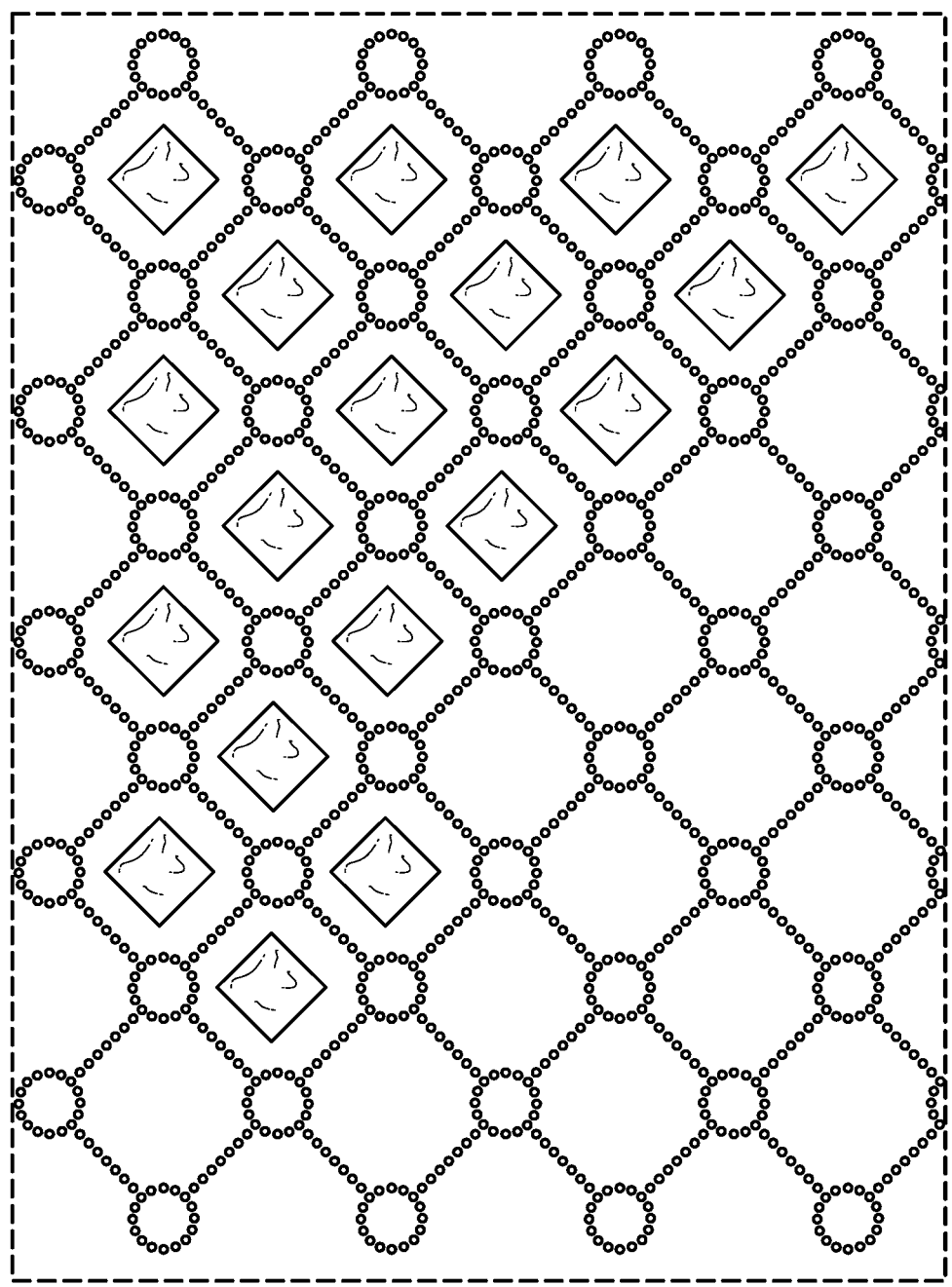
FIG. 14 illustrates an exemplary multilayered laminated fabric structure including batting padding materials according to an embodiment.
Figure 15:
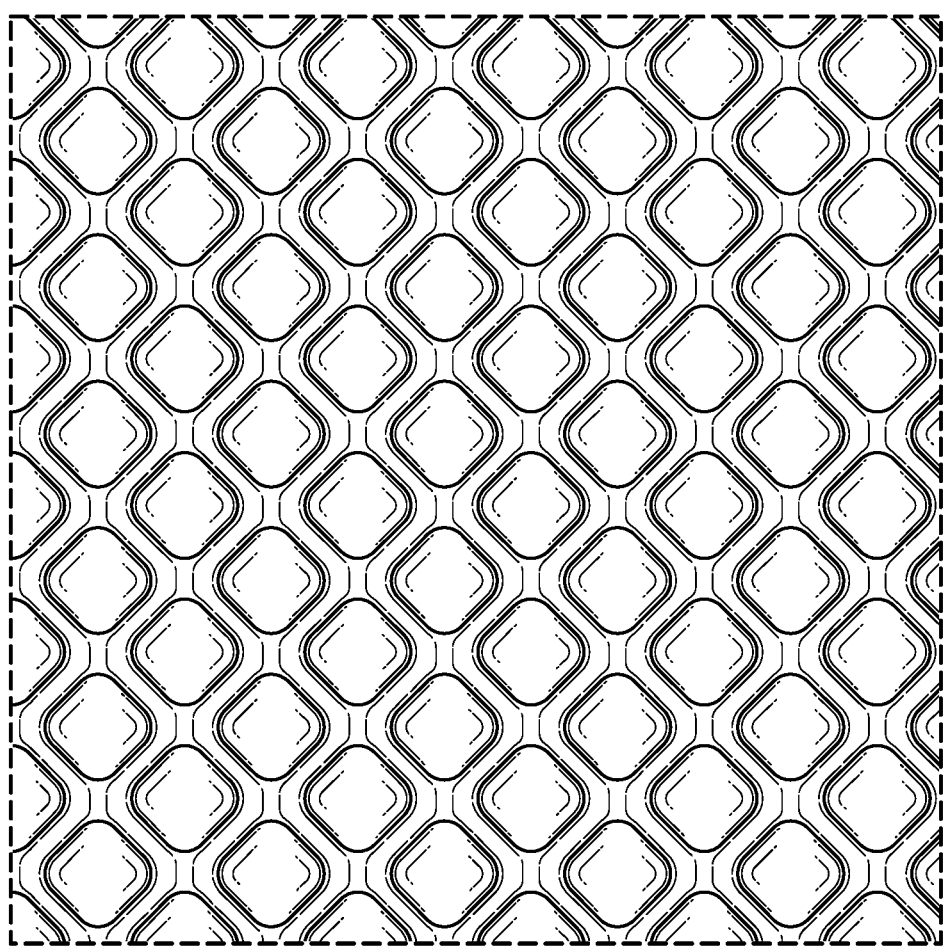
FIG. 15 illustrates a finished laminate structure of FIG. 14 according to an embodiment.

In some embodiments, in operation 912, steam may be applied to the laminate structure 600. The application of steam can result in the expansion of the batting materials 612 volume in between the deposited columns of adhesive 604, as shown in FIG. 6C. FIG. 14 illustrates a partially assembled laminate structure 600 with precut batting material 612 placed in the designated locations, in between adhesive columns 604. In the exemplary embodiment of FIG. 14, prior to the deposition of the discrete adhesive masses 606 the deposition locations have been designated. FIG. 15 illustrates a fully assembled laminate structure 600, where after the top layer 610 is put in place, the discrete adhesive masses 606 are fully or partially cured, resulting in the adhesion of the top and bottom layers together, forming tunnel in between deposited adhesive columns and corresponding to areas where batting materials 612 are or will be located. In the illustration of FIG. 15, the batting material 612 have expanded to their full size, resulting in a desirable structure illustrated in FIG. 15.

FIG. 10 illustrates an exemplary multilayered laminated fabric structure with multiple parallel tunnels formed at different layers of the lamination structure according to an embodiment. The exemplary embodiment of FIG. 10 illustrates parallel tunnels 1008 and 1010 filled with ribbons 1006, wherein each set of parallel tunnels 1008 and 1010 extend in a different direction such that the tunnels 1008 and 1010 cross each other at a 90 degrees angle. However, tunnels 1008 are on a different plane from that of tunnels

1010. For example, as seen in FIG. 10, tunnels 1008 are encased within layers that are above the layers encasing tunnels 101*o*. Furthermore, as illustrated in the exemplary embodiment of FIG. 10, ribbons 1006 located inside tunnels 1008 along part of their length and exit the tunnels 1008 and re-enter tunnels 1012, depending on the requirements of the design. FIGS. 10A and 10B show blowups of sites 1002 and 1004. As shown at site 1002, there are cuts in the fabric layers forming the tunnels 1008 floor or ceiling, allowing for the ribbons 1106 to exit tunnels 1008 at locations 1002 and reenter the tunnels 1008 at locations 1004.

FIG. 10 further illustrates tunnels 1008 and 1010 formed by adhesive dispensed in liquid form by a robotic arm or other automated dispense system. In the exemplary embodiment of FIG. 10, the discrete adhesive masses are dispensed in liquid droplets interconnecting 3 layers of material. One or more of the layers are natural fiber materials, such as silk, wool, cotton and the like. In one example, one, two or all the layers are an organza, such as a silk organza. Adhesive is used to construct 3 layers of fabrics, creating a tunnel to weave through materials (e.g., ribbons 1006) and to create a visible shiny pattern and/or to create sparkle effect.

The apparel (which may be an apparel component) illustrated in FIG. 10 may be fabricated by dispensing adhesive on at least three separate layers of fabric, the adhesive dispensed in a pattern comprising a plurality of columns; stacking the three layers of fabric together to form a stack with a layer of release film on one or both sides of the stack; pressing the layers together; allowing the discrete adhesive masses to at least partially cure such that one or more tunnels are formed between the rows of adhesive; removing the layer of release film; and inserting one or more ribbons in the one or more tunnels.

In another exemplary embodiment, three colors of silk organza are cut to the desired shape of the stack or laminate structure. Next, adhesive is dispensed on the three separate colors of silk organza as follows:
  d. Bottom layer (A)—laser cut holes and dispense glue in ribbon tunnel pattern following artwork A on a section, for example a 35 cm×35 cm square, of color A silk organza (artwork is the pattern of adhesive masses)
  e. Middle layer (B)—laser cut on a section, for example a 35 cm×35 cm square, of color B silk organza
  f. Top layer (C)—laser cut holes and dispense glue in ribbon tunnel pattern following artwork B on a section, for example 35 cm×35 cm square, of color C silk organza
7. Create non-stick template films from glossy non-stick (i.e., Teflon) sheets to match shapes of ribbon tunnel artwork.
  a. These will be used to create both the sparkle effect and keep the wrong layers from bonding together
8. To bond the three layers together—stack the pieces from bottom to top as follows:
  b. Layer A
  c. non-stick template film pieces in shape and location of tunnels on layer C
  d. Layer B
  e. non-stick template film pieces in shape and location of tunnels on layer A
9. On the large flat heat press, between two layers of glossy non-stick template films, bond at an elevated temperature (such as about 80 degrees C.) for 10 seconds at 2-4 psi between two layers of clean release paper (or non-stick films).
10. Remove from heat press, let cool, remove template, let cure, for example for 24 hours
11. Once cured, recut squares on a laser cutter as one unit down to 29 cm×29 cm square.
12. Insert ribbons in tunnels or channels following artwork.

FIG. 11 illustrates an exemplary multilayered laminated fabric structure according to an embodiment. As illustrated in FIG. 11, the apparel 1100 comprises multiple layers of fabric assembled in a laminate structure 1100 using discrete adhesive masses according to FIG. 3. The multilayer apparel laminate structure 1100 displays columns 1102 and 1104 of deposited discrete adhesive masses that adhere to the multiple layers of fabric comprising the multilayer laminate structure. As illustrated in FIG. 11, the discrete adhesive masses have wetted the laminated structure's outer layers of fabric and appear as dark dots or markings visible through the top layer. Wetting of the fabric surface refers to the moistening or damping of the fabric surface area by the deposited adhesive. In the exemplary embodiment of FIG. 11, the discrete adhesive masses have a mat finish and thus appear to have any sheen. In one embodiment, the discrete adhesive masses are clear and colorless and thus reflect the color of the fabric layers they adhere all be it in a mat or semi-glossy or glossy finish. In alternative embodiments, the adhesive may include colors other than clear and thus discrete adhesive masses may reflect their own color rather than the color of the fabrics they adhere to.

The discrete adhesive masses may be used to form various visible adhesive dot patterns, deposition patterns, the sheen of the adhesive dots and that can be designed to enhance the aesthetic look of the apparel. For example, in FIG. 11, columns of discrete adhesive masses 1102 and 1104 are aligned in vertical and horizontal directions. As previously described in relations to FIGS. 3 and 8, the surface of the film used in the assembly of the laminate structure comprising apparel 1100, the adhesive dots may provide a mat or glossy finish to the discrete adhesive masses. In the exemplary case of apparel 1100, the film used in the assembly of the laminated laminate structure imprinted a mat finish on to the wetted dot surfaces which causes the columns of discrete adhesive masses 1102 and 1104 to appear as clear dark spots which are visible and thus can be used to enhance the laminate structure's look and aesthetics.

FIG. 12 illustrates another exemplary multilayered laminated fabric structure according to an embodiment. The multilayered laminate structure 1200 displays a variety of discrete adhesive masses patterns with glossy finishes 1202 in the upper region of the laminate structure 1200 and discrete adhesive masses 1204 with mat finish in the lower region of the laminate structure 1200. Furthermore, the discrete adhesive masses columns have a variety of orientations. The combination of multilayered fabrics forming the laminate structure 1200, the orientation of the columns of discrete adhesive masses and the adhesive bead surfaces reflectivity, glossy 1202 and mat 1204, enable the creation of laminate structure 1200 used in apparel construction, with discrete adhesive masses used as both functional components of the garment assembly, adhering the various layers of fabric, as well as an aesthetic component, enhancing the looks of the apparel (e.g., at areas 1206, 1208).

FIG. 13 illustrates an exemplary multilayered laminated fabric structure with multiple parallel tunnels formed at different layers of the lamination structure according to an embodiment. Similar to FIG. 10, FIG. 13 illustrates another exemplary embodiment of a multilayer laminate structure assembled using multiple layers of fabric affixed together using discrete adhesive masses dispensed in pairs of columns, where the columns of dispensed discrete adhesive masses form the walls of one or more tunnels that can be used to weave through ribbons to create new aesthetic designs. The laminate structure may include multiple layers and the tunnels may be formed on different planes, allowing for intersecting tunnel and ribbon designs such as the criss-cross design illustrated in FIG. 13, where a bottom group of ribbons and tunnels extend from the upper right corner of the apparel to the lower left corner of the apparel. Another set of tunnels and ribbons are located on a lower plane and extend from the upper left corner of the apparel to the lower right corner of the apparel. In the exemplary embodiment of FIG. 13, the ribbons extend outside of the tunnels along part of their length before reentering the tunnels further along their path. This feature allows more flexibility in creating aesthetically attractive apparel designs.

FIG. 14 illustrates an exemplary multilayered laminated fabric structure including batting padding materials according to an embodiment. FIG. 14 laminate structure is created according to the processes described in FIGS. 6A-6C. In the illustrated embodiment of FIG. 14, the columns of discrete adhesive masses are deposited in the criss-cross patterns shown and the batting materials are placed in the center of each square. Once the top layer is put in place, pressure is applied to the laminate structure to adhere the top and bottom layers of fabric by partially curing the deposited discrete adhesive masses. FIG. 15 illustrates a finished laminate structure of FIG. 14 according to an embodiment. In FIG. 15, the batting material has been puffed up by the application of moisture in the form of steam, after the formation of the laminate structure.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments but should be defined only in accordance with the following claims and their equivalents.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

It is contemplated that elements and features of any one disclosed embodiment may be beneficially incorporated in one or more other embodiments. While the foregoing is directed to embodiments of the present disclosure, other and further embodiments of the disclosure may be devised without departing from the basic scope thereof, and the scope thereof is determined by the claims that follow.

The systems and methods of the present disclosure facilitate automation of fabric article manufacture. Using discrete adhesive masses to create complex multilayer laminate fabric structure provides novel and non-obvious techniques to create new fabrics and apparels and using the liquid adhesive deposition to achieve structural and aesthetic designs that are impossible to create with traditional technology.

What is claimed is:

1. A method of making a fabric laminate comprising:
   depositing on a first layer of fabric, a first column and a second column of discrete adhesive masses, wherein the first column and the second column of discrete adhesive masses are separated by a first gap area;
   placing a second layer of fabric on the first layer of fabric enveloping the first column and the second column of discrete adhesive masses;
   placing a first non-adhesive film on a first surface of one of the first layer or the second layer;
   applying pressure to the first non-adhesive film to couple, via the discrete adhesive masses, the first layer to the second layer, wherein the first layer and the second layer within the first gap area remain uncoupled and form a first tunnel, and wherein adhesive of the discrete adhesive masses wets the first surface; and
   removing the first non-adhesive film, wherein an impression of a second surface of the first non-adhesive film is embossed on wetted portions of the first surface.

2. The method of claim 1 further comprising:
   placing a precut film within the first gap area to preserve an opening of the first tunnel; and
   removing the precut film after application of the pressure.

3. The method of claim 1 further comprising pulling a ribbon through the first tunnel.

4. The method of claim 1 further comprising depositing a third column of discrete adhesive masses offset from the second column, wherein the third column and the second column are separated by a second gap area, and wherein the second gap area remains uncoupled to form a second tunnel after said applying the pressure.

5. The method of claim 4 wherein a width of the second gap area varies along a length of the third column of discrete adhesive masses.

6. The method of claim 4, wherein the first column and the second column are oriented in a first direction.

7. The method of claim 6, wherein the third column is oriented in a second direction not parallel to the first direction.

8. The method of claim 1, further comprising:
   cutting a first slit in the second layer to form a first opening;
   cutting a second slit in the first layer to form a second opening; and
   pulling a ribbon out of the first tunnel at the first opening and pulling the ribbon into the first tunnel at the second opening, wherein a section of the ribbon remains outside of the first tunnel.

9. The method of claim 1 wherein one or more columns are curvilinear.

10. The method of claim 9 wherein one or more columns cross each other.

11. The method of claim 1 wherein a finish of the surface of the first non-adhesive film is one of: matte, semi-gloss, or glossy.

12. The method of claim 11 wherein the first non-adhesive film has more than one surface finish along its surface.

13. The method of claim 1 wherein the second surface of the first non-adhesive film includes a covering that leaves a residue on the wetted portions of the first surface.

14. A method of making a fabric laminate comprising:
   depositing on a first layer of fabric, a first column and a second column of discrete adhesive masses, wherein the first column and the second column of discrete adhesive masses are separated by a first gap area;
   placing a precut non-adhesive film in the first gap area;
   placing a second layer of fabric on the first layer of fabric covering the first column and the second column of discrete adhesive masses;
   applying pressure to adhere the first layer to the second layer, wherein the first layer and the second layer remain uncoupled within the first gap area to form a tunnel; and
   removing the precut film from the tunnel.

15. A method of making a fabric laminate comprising:
   depositing a first column and a second column of discrete adhesive masses on a first layer, wherein a first gap separates the first column from the second column;
   placing a ribbon in the first gap;
   placing a layer of non-stick film on at least the first layer and a second layer forming a laminate stack, wherein the non-stick film has a surface finish;
   applying pressure to the laminate stack to laminate the first layer and the second layer by partially curing the first column and the second column, wherein adhesive of the discrete adhesive masses wets the first layer or the second layer; and
   removing the non-stick film, wherein the non-stick film imprints a first indentation on a wetted portion of a surface of the first layer or the second layer matching a surface finish of the non-stick.

16. A method of making a fabric laminate comprising:
   placing a first fabric layer;
   depositing a first column and a second column of discrete adhesive masses on the first fabric layer, wherein the first column and the second column of discrete adhesive masses are separated by a first gap;
   placing a precut batting in the first gap;
   placing a second fabric layer on the first fabric layer;
   applying pressure to couple the first layer and the second fabric layer by partially curing the first column and second column of discrete adhesive masses and forming a laminated stack, wherein within the first gap, the first fabric layer and the second fabric layer remain uncoupled; and applying steam to the laminated stack to expand a volume of the precut batting material.

* * * * *